United States Patent Office 3,618,252
Patented Nov. 9, 1971

3,618,252
FISHING RODS
Benjamin Bocking, South Lowestoft, and Roy Gerald Catchpole, Lowestoft, England, assignors to Ness Point-Investments Limited, Lowestoft, England
Filed Aug. 21, 1969, Ser. No. 851,913
Claims priority, application Great Britain, Aug. 21, 1968, 40,058/68
Int. Cl. A01k 89/00
U.S. Cl. 43—20        7 Claims

ABSTRACT OF THE DISCLOSURE

The invention relates to a fishing rod and reel which comprises a rod and spool, the spool being disposed on the end of the rod remote from the handle of the rod, the spool being coaxial with the longitudinal axis of the rod and mounted for rotation relative to the rod by winding gear located at the handle of the rod, there being a line guide on the rod adjacent a line-carrying cavity of the spool.

---

The invention relates to a rod and reel in one combination for fishing.

It is an object of the invention to enable an inexperienced fisherman to cast longer distances than the distances which he could obtain with conventional tackle.

According to the invention there is provided a fishing rod and reel which comprises a rod and spool attached to the tip of the rod, the axis of the spool being coaxial with the longitudinal axis of the rod and the spool being adapted to be rotated relatively to the rod by winding gear means being provided on the rod and disposed adjacent a line-carrying cavity of the spool and a projecting member coaxial with the axis of the spool.

According to the invention furthermore there is provided a fishing rod and reel in which there is provided a line on the spool which has a loop in the end of the line adjacent a hook and weight which loop is adapted to be hooked over the projecting member to facilitate casting of the line.

A fishing rod and reel according to the invention has many advantages over the conventional rod and reel combination namely:

(A) Before fishing the rod does not have to be assembled and the line does not have to be threaded through rings. After fishing the rod does not have to be dissembled or the line unthreaded, which is a great convenience at the end of the day when the angler may have cold, wet fingers.

(B) A bale arm is unnecessary, therefore, there are no bale arm troubles.

(C) The line is cast with the reel acting as a fixed spool reel and recovered as though using a centre spindle reel.

(D) Over-runs when casting are eliminated.

(E) There is no need to hold and release the line at the correct moment when casing, therefore no sore fingers and no drag on the line.

(F) It is possible to have a large diameter spool with only narrow line containing lips, thus reducing friction when casting and speeding up recovery of the line when rewinding.

(G) There are no rings for the line to run through. When casting friction is thus reduced it results in longer casts.

In the absence of rings, reeling in a fish is much simplified, for with conventional rods fish pull the line onto the rings and it is the friction thus set up which puts the strain on line and reel. Wear on the line is reduced, therefore, giving it a longer life.

(H) When twists occur in the line when using the rod according to the invention, usually after twenty-five casts on average, it is a simple matter to reverse the spool on the end of the rod, change the gear and then further casting untwists the line.

(I) The rod and reel according to the invention is cheap to produce and can be sold at a lower price than conventional tackle of comparable casting potential.

(J) Design of the rod enables it to be used by both left handed and right handed anglers.

Figure 1:
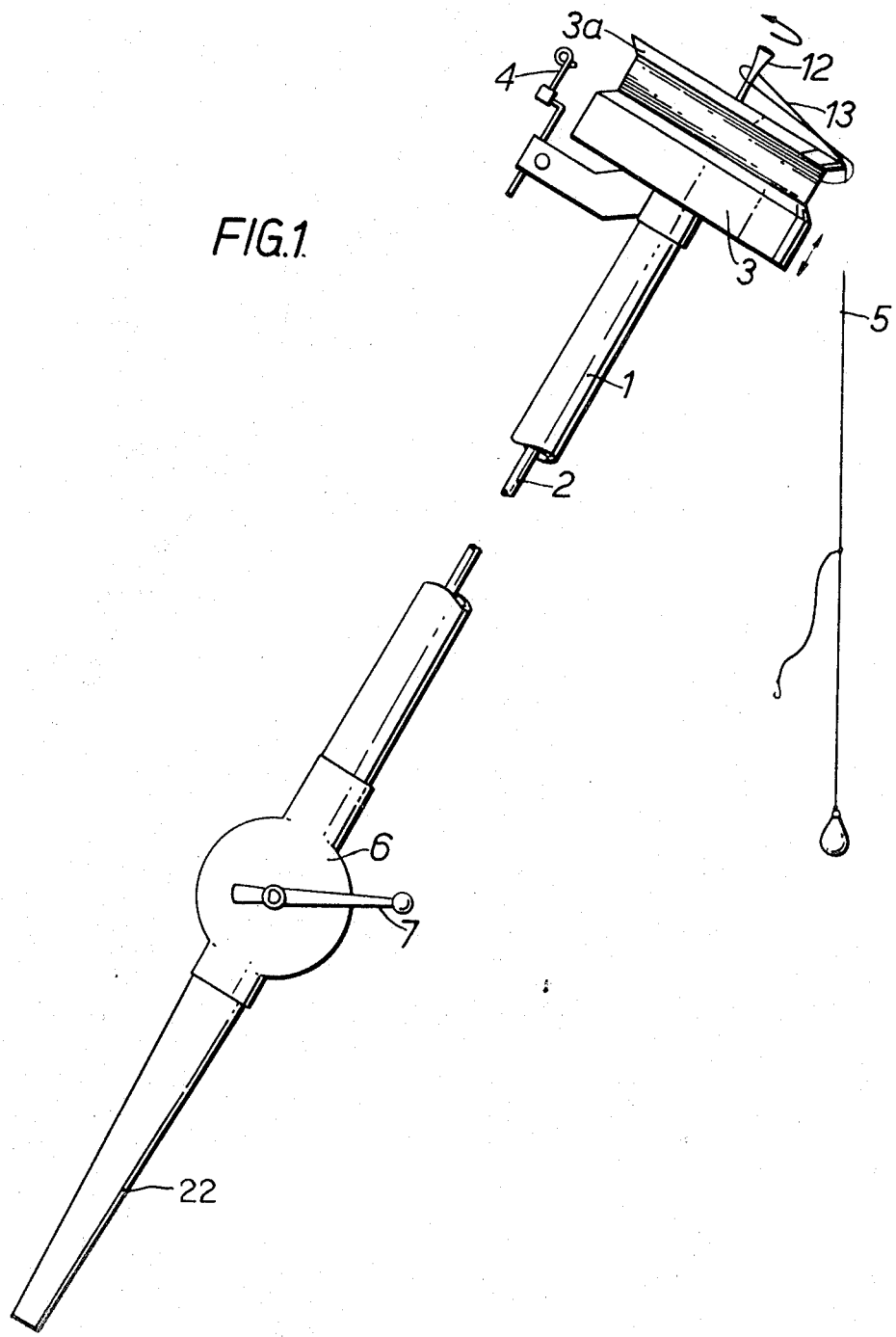
Figure 2:
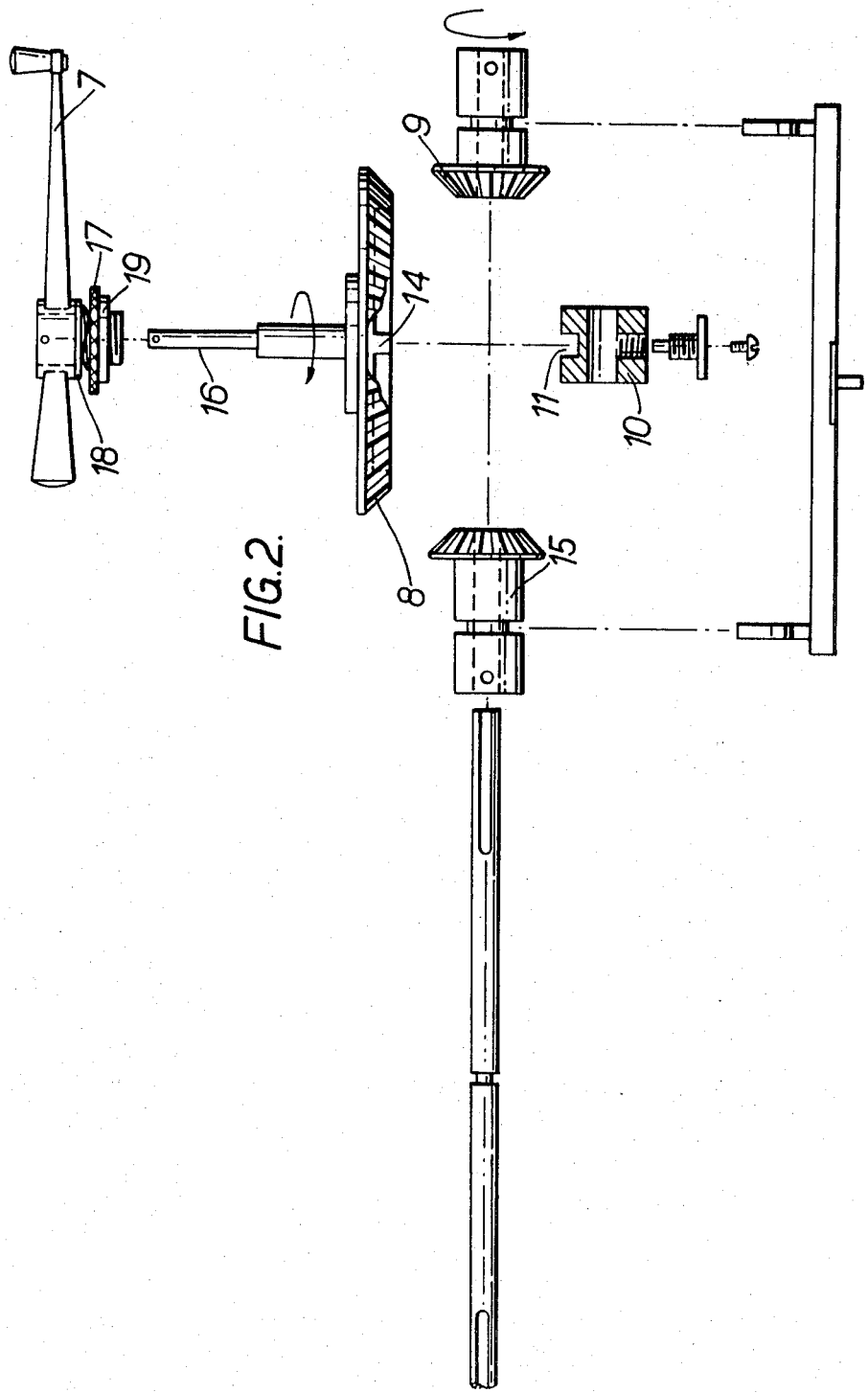
Figure 3:
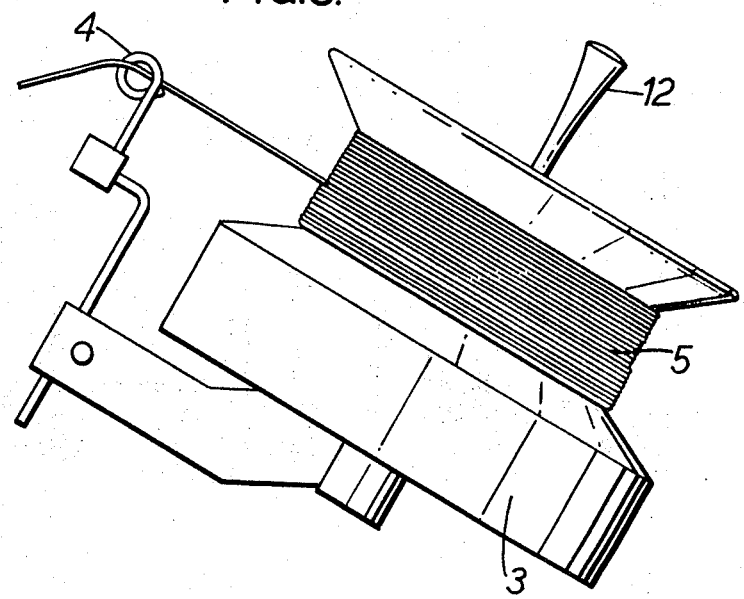
Figure 4:
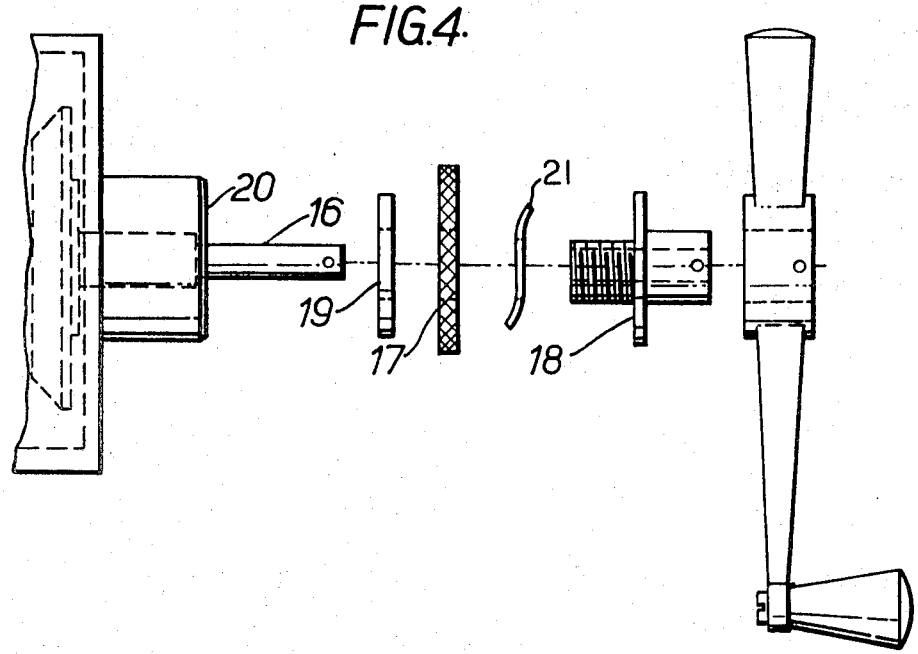

One embodiment according to the invention is hereinafter described and illustrated with reference to the accompanying drawings, in which:

FIG. 1 is a side elevation of the fishing rod and reel;
FIG. 2 is an exploded view of the winding mechanism;
FIG. 3 is a perspective view of the line guide; and
FIG. 4 is an exploded view of a "drag" means for the winding mechanism.

The rod is constructed of two substantially coaxial members one in the form of a tube 1, preferably constructed from glass fibre and the other a member in the form of a shaft 2, located inside the said tube 1.

Located on the shaft 2 is a spool 3, such that when the shaft 2 and spool 3 are rotated and axially reciprocated relative to the tubular member 1 and stationary pick-up guide 4, the line 5, when guided by the guide 4, is evenly wound onto the spool 3. The pick-up guide or eyelet 4 is rigidly located on the tubular member 1 and is disposed directly outwardly from the recess formed in the spool to cause the line 5 to be wound in a direction which is substantially transverse to the rotational axis of the spool.

The winding mechanism for actuating the shaft 2 is contained in a housing 6 which is disposed adjacent the support handle 22.

As the crank handle 7 is rotated a bevel gear 8 is also rotated. Engaged with the bevel gear 8 is a further bevel gear 9 which is keyed onto the shaft 2 so as to allow no relative rotational movement but to allow the gear 9 to slide axially in relation to the said shaft 2. Thus as handle 7 is rotated the shaft 2 is rotated.

An axial movement is also imparted to the shaft 2 by means of a member 10 which is located on the shaft 2 so as to allow free rotational movement but no axial movement relative to the shaft 2. The member 10 is moved axially relative to the shaft 2 by means of a pin 14 located eccentrically on the bevel gear 8 which pin is slidably located in a groove 11, which groove extends perpendicular to the shaft 2 and perpendicular to the axis of the bevel gear 8.

To reverse the direction of rotation of the spool with respect to the crank handle rotation a further gear wheel 15 is located on the shaft 2 similar to the mounting of the bevel gear 9 but adapted to slide on the shaft 2 into and out of engagement with the opposite side of the bevel gear to the side of the bevel gear where the bevel gear 9 is engaged. Thus when the direction of rotation of the spool is required to be reversed the bevel gear 9 is slid along the shaft 2 out of engagement with the bevel gear 8 at the same time the gear 15 is slid along the shaft 2 into engagement with the bevel gear 8 thus the drive from the bevel gear 8 being transmitted to the shaft 2 through the gear 15 thus causing the direction of rotation of the shaft 2 to reverse. The said gear 15 and the bevel gear 9 may be coupled together so as one gear is moved out of engagement the other gear is moved into engagement.

Means may be provided on the crank spindle 16 for providing a variable "drag" on the gears and spool. This "drag" is to control the tension to be maintained in the line when playing a fish.

The "drag" is produced by a knarled ring 17 which is threaded into a friction hub assembly 18 which assembly 18 is in turn rigidly located onto the crank spindle 16. The friction is created by the knarled ring 17 pressing the nylon friction washer 19 against the gear housing face 20. A spring washer 21 is provided to restrain movement between the friction hub assembly and the knarled ring 17.

When casting with the rod, the line is removed from the pick-up guide 4, and a loop in the line is hooked over the projecting member 12, as shown in FIG. 1. The line is now cast and as the rod points in the direction of the cast, the loop 13, in the line slips off the projecting member 12 and the line then leaves the reel which acts as a fixed spool reel.

To rewind the line after the cast, the line is put through the pick-up guide and the crank handle is then turned and the line is wound into the spool as with a conventional centre pin reel.

A means for applying friction to the winding mechanism may be provided as a line brake.

The spool 3 may be so designed that it is possible to reverse the line carrying part 3a such that if twists occur in the line then it is a simple matter to reverse the line carrying part 3a and reverse the direction of rotation of the member 2 so that the subsequent casts and line recovery untwist the line.

We claim:
1. A line-throwing rod, comprising:
   elongated rod means comprising a central rod and an outer tubular member concentric with said central rod, the central rod being rotatable and axially reciprocable and the outer tubular member being nonrotatable;
   handle means secured to said outer tubular member adjacent one end of said rod means, the other end of said rod means constituting the free, outermost end of said line-throwing rod with said free end being substantially spaced from said one end of said rod means;
   bail-free reel means mounted at the free, outermost end of said line-throwing rod with said reel means being substantially spaced from said handle means, said reel means comprising a spool nonrotatably secured to said central rod for rotation and axial reciprocation therewith;
   winding means mounted on said rod means adjacent said handle means for rotating and axially reciprocating said central rod and said spool, said winding means being substantially spaced from said reel means;
   said winding means including a rotatable crank arm and gear means coacting between said crankarm and said central rod for causing rotation of said central rod in response to rotation of said crank arm;
   said winding means further including drive means coacting between said central rod and said crank arm for causing axial reciprocation of said central rod and said spool in response to rotation of said crank arm; and
   stationary guide means disposed adjacent said spool for permitting a line to be wound onto said spool in a direction substantially transverse to the rotational axis of said spool, said stationary guide means including an eyelet member fixedly interconnected to said outer tubular member and disposed radially outwardly from said spool in alignment with the line-receiving recess formed on said spool.

2. A rod according to claim 1, further including projection means fixedly secured to and projecting coaxially from the free end of said spool whereby the line wound on said spool is adapted to have a loop formed therein which is hooked over said projection means to facilitate casting of the line, said line during casting being free of said stationary guide means.

3. A rod according to claim 1, wherein said gear means includes shiftable means coacting between said crank arm and said central rod for permitting the direction of rotation of said central rod to be reversed relative to the direction of rotation of said crank arm.

4. A rod according to claim 3, wherein said gear means includes a pair of gears nonrotatably interconnected for simultaneous rotation and a further gear disposed for alternate meshing engagement with one of the gears of said pair, said shiftable means coacting with said pair of gears for enabling said further gear to be relatively moved into meshing engagement with a selected one of said first pair of gears.

5. A rod according to claim 3, wherein said gear means includes a drive bevel gear nonrotatably interconnected to said crank arm and a pair of driven bevel gears nonrotatably interconnected to said central rod, said driven bevel gears being coaxial and fixedly interconnected and being slideably mounted on said central rod and disposed for shifting movement relative to said central rod for enabling said driven bevel gears to be alternately displaced into meshing engagement with said drive bevel gear.

6. A rod according to claim 1, wherein said reel means is removable from the end of said central rod to enable the position of the spool to be axially reversed.

7. A rod according to claim 1, wherein said winding means includes housing means fixedly interconnected to said outer tubular member, and friction drag means coacting between said housing means and said crank arm to create a frictional drag to restrict the free rotation of said central rod and said spool during casting.

References Cited

UNITED STATES PATENTS

| | | | |
|---|---|---|---|
| 1,625,988 | 4/1927 | Dice | 43—20 X |
| 2,628,444 | 2/1953 | Oak | 43—20 |
| 3,084,885 | 4/1963 | Hornbostel | 43—20 X |
| 3,401,481 | 9/1968 | Bocking et al. | 43—20 |

WARNER H. CAMP, Primary Examiner